United States Patent
Arbouzov

(10) Patent No.: US 10,974,134 B2
(45) Date of Patent: Apr. 13, 2021

(54) ADVANCED GAMING VISUALIZATION SYSTEM

(71) Applicant: Ivan Arbouzov, Southlake, TX (US)

(72) Inventor: Ivan Arbouzov, Southlake, TX (US)

(73) Assignee: Incyte Corporation, Wilmington, DE (US)

( * ) Notice: Subject to any disclaimer, the term of this patent is extended or adjusted under 35 U.S.C. 154(b) by 22 days.

(21) Appl. No.: 16/439,157

(22) Filed: Jun. 12, 2019

(65) Prior Publication Data

US 2019/0381399 A1 Dec. 19, 2019

Related U.S. Application Data

(60) Provisional application No. 62/685,704, filed on Jun. 15, 2018.

(51) Int. Cl.
*A63F 9/24* (2006.01)
*A63F 13/245* (2014.01)
(Continued)

(52) U.S. Cl.
CPC ............ *A63F 13/245* (2014.09); *A63F 13/23* (2014.09); *A63F 13/837* (2014.09); *G06T 3/40* (2013.01);
(Continued)

(58) Field of Classification Search
CPC ...... A63F 13/245; A63F 13/23; A63F 13/837; A63F 2300/1062; A63F 2300/8076; A63F 13/98; G06T 3/40
See application file for complete search history.

(56) References Cited

U.S. PATENT DOCUMENTS 3,967,402 A * 7/1976 Cooksey .................. F41A 3/58
  42/10
4,285,523 A * 8/1981 Lemelson ............... A63F 13/02
  463/5

(Continued)

FOREIGN PATENT DOCUMENTS

GB       2262799 A     6/1993
WO    2012/052731 A    4/2012

OTHER PUBLICATIONS

Chuck Hawks. Leupold Alumina Accessories. Online. Nov. 21, 2007. Accessed via the Internet. Accessed Aug. 26, 2020. <URL: https://web.archive.org/web/20071121140849/https://www.chuckhawks.conn/leupold_alumina_accessories.htm> (Year: 2007).*

(Continued)

*Primary Examiner* — Dmitry Suhol
*Assistant Examiner* — Carl V Larsen
(74) *Attorney, Agent, or Firm* — Fish & Richardson P.C.

(57) ABSTRACT

A monocular unit permits visualization of image data received from an imaging device associated with a mobile computing device. The image data is displayed on a display of the mobile computing device. A trigger unit indicates a trigger actuation, where the trigger unit includes a trigger and a trigger bar, and where the trigger bar is moved by actuation of the trigger. A mounting component mounts the mobile computing device in relation to the monocular unit and the trigger unit. Adjustment wheels permit adjustment of the position of the mobile computing device in relation to the monocular unit, the trigger unit, and the mounting component.

20 Claims, 6 Drawing Sheets

(51) Int. Cl.
  *H04M 1/04* (2006.01)
  *G06T 3/40* (2006.01)
  *A63F 13/23* (2014.01)
  *A63F 13/837* (2014.01)

(52) U.S. Cl.
  CPC ....... *H04M 1/04* (2013.01); *A63F 2300/1025* (2013.01); *A63F 2300/1062* (2013.01); *A63F 2300/8076* (2013.01); *A63F 2300/8082* (2013.01); *G06T 2200/16* (2013.01)

(56) References Cited

U.S. PATENT DOCUMENTS

| | | | | |
|---|---|---|---|---|
| 5,495,676 | A * | 3/1996 | Chesnut | F41G 1/383 359/511 |
| 8,240,075 | B1 * | 8/2012 | Mullin | F41G 1/38 42/125 |
| 8,469,824 | B1 * | 6/2013 | Farley | A63F 13/213 463/53 |
| 8,951,128 | B1 | 2/2015 | Farley et al. | |
| 9,717,995 | B2 * | 8/2017 | Kliot | G06F 1/1607 |
| 9,901,813 | B2 * | 2/2018 | Keating | A63F 13/00 |
| 10,341,162 | B2 * | 7/2019 | Zou | F41J 5/02 |
| 2012/0282987 | A1 * | 11/2012 | Romero | G06F 3/041 463/5 |
| 2013/0225288 | A1 | 8/2013 | Levin et al. | |
| 2013/0331148 | A1 * | 12/2013 | Brough | H04N 5/2252 455/557 |
| 2013/0344461 | A1 * | 12/2013 | Tello | F41G 3/2644 434/21 |
| 2014/0213365 | A1 | 7/2014 | Cao | |
| 2015/0168103 | A1 * | 6/2015 | Ilacqua | F41G 1/383 42/143 |
| 2018/0087875 | A1 * | 3/2018 | Yost | F41G 11/003 |
| 2018/0149444 | A1 * | 5/2018 | Pell | A63F 13/245 |
| 2019/0178605 | A1 * | 6/2019 | Evans | F41B 5/148 |

OTHER PUBLICATIONS

International Search Report and Written Opinion issued in PCT/US2019/036695, dated Aug. 26, 2019.

* cited by examiner

ADVANCED GAMING VISUALIZATION SYSTEM

BACKGROUND

Current gaming devices, such as a head-mounted binocular-type system used in virtual reality (VR) or augmented reality (AR) or a mount attached to a replica-type weapon, are configured to position a mobile computing device (such as, smart phones or tablets) to act as a platform for operating software applications providing a gaming experience. However, the gaming devices are not configured to permit ready access to a mobile computing devices' display or operating buttons (such as, a home or sleep/wake button) so as to perform normally available functionality (such as, tactile control of display visual elements, data entry, or locking/unlocking the mobile computing device). In current gaming devices, the entire (or a substantial portion of a) display of a mobile computing device is positioned to be in direct view of a user and to be generally used for display of visual data only.

While mobile computing device sensor data (such as, motion/orientation and location services) is typically available for use in current gaming devices, configurations of the current gaming devices do not permit efficient leveraging of other sensor data. For example, current gaming devices do not permit efficient leveraging of mobile computing device camera input, image recognition, and location data in a gaming experience while also permitting user interaction with a display or other controls of the mobile computing device.

SUMMARY

The present disclosure describes an Advanced Gaming Visualization System (AGVS).

In an implementation, a monocular unit permits visualization of image data received from an imaging device associated with a mobile computing device. The image data is displayed on a display of the mobile computing device. A trigger unit indicates a trigger actuation, where the trigger unit includes a trigger and a trigger bar, and where the trigger bar is moved by actuation of the trigger. A mounting component mounts the mobile computing device in relation to the monocular unit and the trigger unit. Adjustment wheels permit adjustment of the position of the mobile computing device in relation to the monocular unit, the trigger unit, and the mounting component.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the AGVS can provide a user with a unique capability for hands-on emulation of performance and adjustments to a day- or night-vision weapon optical device (for example, a rifle scope), an ability to learn and to practice controls (such as, windage and elevation adjustments). Second, the configuration of the AGVS allows game developers to develop multiple gaming scenarios to permit manual touch-type controls on a mobile computing device display. Third, the AGVS can be used with a software application on the mobile computing device providing virtual—(for example, simulated) or augmented—reality (for example, actual and virtual data overlay) applications using image data received from the mobile computing device imaging device (or an auxiliary imaging device). Fourth, the AGVS can be used with-or-without a monocular unit (MU). For example, the AGVS can be configured to programmatically combine a player location, compass direction of a mobile computing device imaging device field-of-view (FOV) and an image recognition application, to permit players to enrich a competitive gaming experience by permitting the players to engage in a virtual combat experience without a requirement of a laser, projected light source, or any other active energy emitting device to mark an opposing player. In this example, the opposing player can be located in the FOV of a player's imaging device and the AGVS can recognize the opposing player (for example, the image recognition software can identify a human shape, a particular displayed logo, or other visually-recognizable object. In this example, player location, movement, and other data can be determined (for example, using the Global Positioning System (GPS) to provide a distance between particular players and to estimate if a reticle (such as, a cross-hair) is properly adjusted by using one or more adjustment wheels (AWs). Fifth, a server-based software application can be used in conjunction with the AGVS to keep score, store images of confirmed hits and any other relevant information. Sixth, one or more software applications associated with the AGVS can permit two-way or hive-type audio/visual communication between players, other parties (such as, spectators/trainers), or a combination of both. The use of two-way audio/visual communication permits emulation of a modern tactical-type environment. In some implementations, live video from a FOV of a player's mobile computing device imaging device/auxiliary imaging device (or other sensor data) can be gathered, collected, transmitted, stored, and processed to allow real-time analysis of player actions, tactics, strategies, performance, metrics, or scores.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
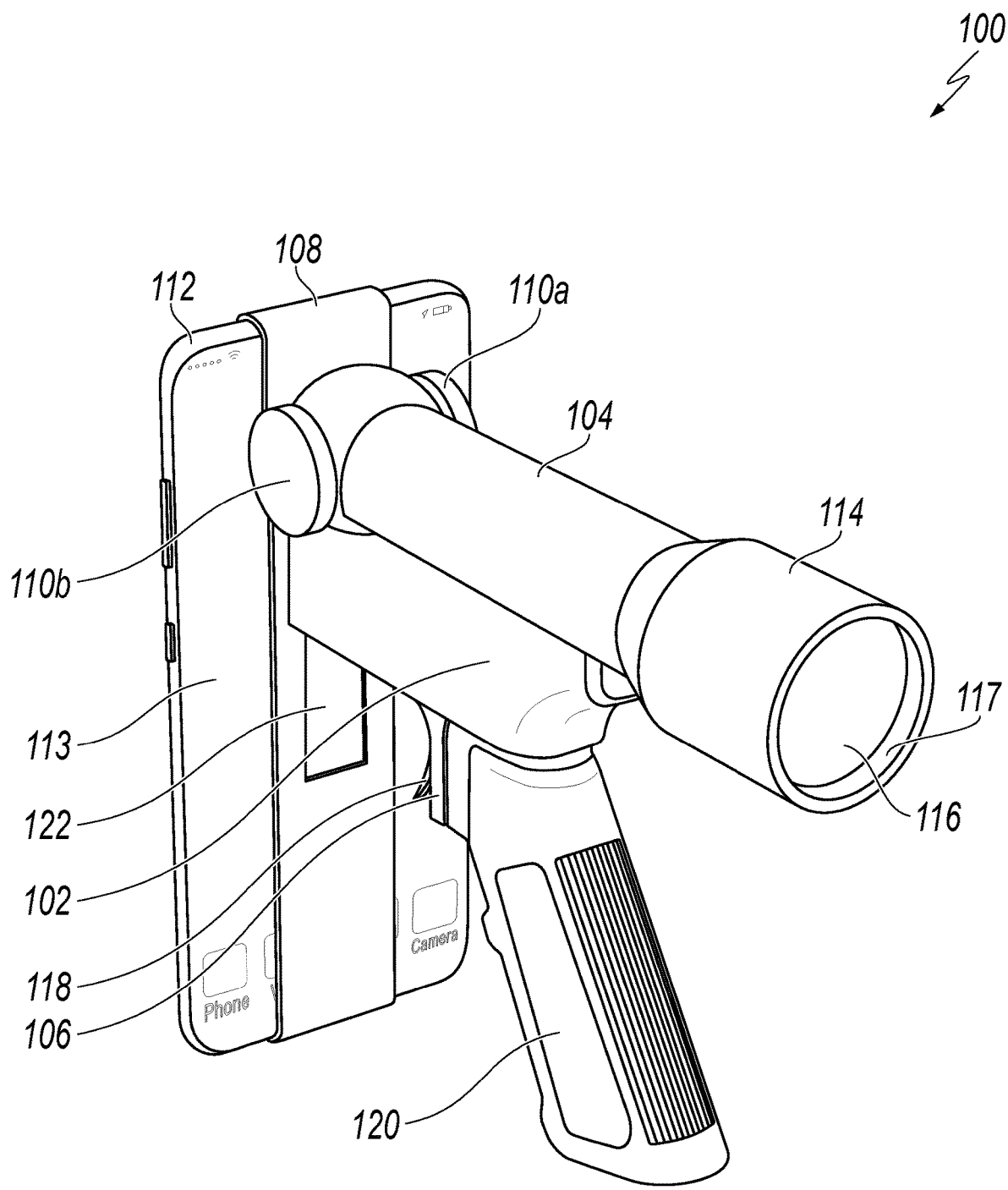
FIG. 1 is a high-level perspective view of an Advanced Gaming Visualization System (AGVS), according to an implementation of the present disclosure.

The following detailed description describes an Advanced Gaming Visualization System (AGVS), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Current gaming devices, such as a head-mounted binocular-type system used in virtual reality (VR)/augmented reality (AR) or a mount attached to a replica-type weapon, are configured to position a mobile computing device (such as, smart phones or tablet computers) to act as a platform for operating software applications providing a gaming experience. However, the gaming devices are not configured to permit ready access to a mobile computing devices' display or operating buttons (such as, a home or sleep/wake button) so as to perform normally available functionality (such as, tactile control of display visual elements, data entry, or locking/unlocking the mobile computing device). In current gaming devices, the entire (or a substantial portion of a) display of a mobile computing device is positioned to be in direct view of a user and to be generally used for display of visual data only.

While mobile device sensor data (such as, motion/orientation and location services) is typically available for use with current gaming devices as part of a gaming experience, configurations of the current gaming devices do not permit efficient leveraging of some other sensor data. For example, current gaming devices do not permit efficient leveraging of mobile computing device camera/auxiliary imaging device input, image recognition, and location (for example, Global Positioning System (GPS)) data in a gaming experience while also permitting user interaction with a display or other controls of the mobile computing device. One consequence of this deficiency is that it is difficult to emulate a single-aperture, optical-type weapon sight (such as, a rifle scope, a dot-type sight, or a handgun sight) for use in gaming experiences using a mobile computing device.

The present disclosure describes a combination of, among other things, an optical eyepiece and a magnification lens of a monocular unit (MU), a trigger unit (TU), adjustment wheels (AWs), and a mobile computing device mounting component (MC) to secure a mobile computing device. In some implementations, one or more of the MU, the TU, and the AWs can be calibrated in relation to a display of the mobile computing device. Software application parameters can be established to correspond to the field-of-view of the MU and provide responsive zone locations for a triggering contact element as part of the TU and responsive to manipulation (for example, turning) of the AWs. Additionally, some implementations can include, among other things, remote controls, apparatuses, and computer programs/data stored or executed on one or more client- or server-computing devices, each configured to perform one or more actions of methods associated with the described AGVS.

FIG. 1 is a high-level perspective view of an AGVS 100, according to an implementation of the present disclosure. As illustrated, the AGVS 100 includes, at a high-level, a body 102, MU 104, TU 106, a MC 108, and AWs 110a/110b. The AGVS 100 secures a mobile computing device 112.

The body 102 is configured as a frame to support the MU 104, TU 106, and MC 108. For example, the frame can be a modular component that can be used to integrate various configurations of the MU 104, TU 106, and MC 108. In some implementations, the frame 102 can be configured to allow a user to change one or more of the MU 104, TU 106, and MC 108 to re-configure the AGVS 100 depending on various applications, scenarios, or uses.

In some implementations, the body 102 can be configured to contain electronics (for example, a computer(s) or wired/wireless communication systems), power supplies (for example, batteries), or other devices consistent with this disclosure. A computer(s) included in one or more components of AGVS 100 can be used to provide various functionality associated with the use of the AGVS 100. For example, in some implementations, the frame 102, MU 104, TU 106, or MC 108 can be configured to contain vibrational or mild shock units that can be used to indicate a "hit" on a user. In some implementations, the frame 102, MU 104, TU 106, or MC 108 can be configured to contain sensors (for example, a gyroscope, accelerometer, attitude, linear acceleration, gravity, and magnetometer) to provide multi-axis orientation determination, movement, and position data. For example, the AGVS 100 can leverage the sensors to determine orientations of the AGVS 100 in the X-, Y-, and X-axis or combinations of the X-, Y-, and Z-axis. The orientation data can be used by a software application executing on a secured mobile computing device in conjunction with data available from sensors incorporated into the mobile computing device. The AGVS 100 sensor data can be used by one or more software applications (for example, executing on the mobile computing device, other mobile computing devices, or servers communicating with the mobile computing device) to enhance/augment similar or other data available from the mobile computing device or for other purposes consistent with this disclosure.

As mentioned, the frame 102 supports a connection (not illustrated) to the MC 108. The connection permits the frame 102 to be adjusted with respect to the MC 108 (and by extension a display 113 of the mobile computing device 112). For example, the AWs 110a/110b (description following) can be used to adjust the frame 102, MU 104, TU 106, and MC 108 against the display 113. Any connection type (for example, magnetic or mechanical) can be used to connect the frame 102 and the MC 108 and are considered to be within the scope of this disclosure.

The MU 104 includes eyepiece 114, magnification lens 116, and a fine-focus assembly 117. The eyepiece 114 can be configured as a sealed unit or to permit changing of the magnification lens 116, fine-focus assembly 117 (for example, the eyepiece can be configured to be unscrewed from/screwed into the MU 104 or the magnification lens 116/fine-focus assembly 117 can be removed/replace in the eyepiece 114.

The magnification lens 116 and fine-focus assembly 117 work together to permit focus of an image rendered on display 113. The display 113 is used to project an image gathered from an imaging device (for example, a camera of the mobile computing device 112 or auxiliary imaging device attached to the mobile computing device 112 or element of the AGVS 100). In some implementations, an afocal adaptor can be used with the mobile computing device 112 or by the MU 104 to enhance visual data (for example, to permit longer-range visual imaging or higher magnification).

A software application executing on mobile computing device 112 can display an image on display 113. The image can be configured/formatted (for example, at a specific size, clarity, and configuration) to be magnified and focused by the eyepiece 114 for viewing by a user.

In some implementations, portions of the display 113 of a mobile computing device secured by the AGVS 100 can be accessed by the user (for example, using a visual graphical user interface (GUI) element on the sides of display 113 not occluded by the MC 108 to permit changes to the size, clarity, and configuration of the image on display 113 to assist with initial/default or routine focus of an image viewed through the eyepiece 114 and to compensate for particular mobile computing device display specifications (for example, resolution, brightness, pixel density, contrast, and brightness). Following adjustments using the software application, the eyepiece 114 can be used to perform fine adjustments (for example, using fine-focus assembly 117 in a rotational manner similar to focusing devices for conventional optical devices—such as a rifle scope, telescope, or spotting scope).

In some implementations, the lens 116 can be configured to permit a multitude of uses. For example, in addition to magnifying, lens 116 can be configured to be filtering (such as, for visible, infrared, or ultraviolet light) or colored (such as, to simulate night vision, red vision, or monochrome). In some implementations, lens 116 can include more than one lens that is placed into an assembly. In some implementations, lens 116 (or one or more lenses in an assembly acting as lens 116) can be configured to be user replaceable depending on various applications, scenarios, or uses.

In some implementations, the MU 104 can also contain additional optics, mechanisms, or even electronics. For example, the MU 104 can contain a lens closer in proximity to the MC 108/display 113 and a lens (for example, lens 116) in the eyepiece 114. In this example, additional mechanisms in MU 104 can be used to manipulate the multiple lenses to provide finer/enhanced focus functionality. Also in this example, the finer-focus assembly 117 could be integrated with the additional mechanisms or additional mechanisms (not illustrated) can be provided to allow for functional interaction with the MU 104.

The TU 106 includes a trigger 118 that works (for example, mechanically or electronically) with a trigger bar/interactive element ("trigger bar") (not illustrated—refer to FIG. 2 for additional detail) to interact with display 113 on mobile computing device 112 within the confines of a slot (that is, the trigger bar physically touches the display 113). For example, the trigger 118 can be mechanically/electrically coupled with the trigger bar to transfer conductive touch from a user's finger to the display 113. In some implementations, the trigger bar can be coupled with a contact element (for example, a stylus tip) that makes contact with the display 113. An actuation of the trigger 118 can be detected as a touch of a user's (player's) finger on the display 113. A software application executing on the mobile computing device 112 can be configured to detect the trigger actuation as an action to simulate firing a simulated weapon at an opposing player. Detection of an actuation of trigger 118 can produce an indication in the software application that the simulated weapon has been fired (for example, a screen flash or data viewable on the display 113 viewable through the eyepiece 114).

The TU 106 includes a grip 120 for gripping by a user. The grip 120 permits use of the AGVS 100 as a simulated weapon (for example, a rifle or handgun). In some implementations, the grip 120 can be configurable for size, material, or other characteristics desirable by the user. Also as previously stated, the grip 120 can be configured to contain electronics (for example, a computer(s) or wired/wireless communication systems), power supplies (for example, batteries), vibrational or mild shock units that can be used to indicate a "hit" on a user, charging contacts (for use with a contained rechargeable battery, or other devices consistent with this disclosure.

The MC 108 is configured to secure a mobile computing device 112 to the AGVS 100 (as illustrated, a smart phone) with the display 113 facing rearward (that is, toward a user gripping/using the AGVS 100). The MC 108 curves around opposite edges of the mobile computing device 112 and can be configured in a portrait orientation, a landscape orientation, or an orientation somewhere in-between). In some implementations, the MC 108 can be configured of rubber, plastic, lined metal (such as, aluminum). The material can be chosen to be non-marring/damaging to the mobile computing device casing or display 113. In some implementations, the MC 108 can be configured to wrap entirely around the mobile computing device 112 in one or more orientations. The configuration (for example, orientation, weight, and strength) of the MC 108 can depend upon an intended use of the MC 108.

In some implementations, the MC 108 can be configured (not illustrated) to secure various mobile computing devices 100 using spring action, slide/lock, ratchet, friction, mechanical lock, or other mechanism. The configuration of the MC 108 can be selected/operated based on the configuration (for example, size, thickness, or weight) of a particular mobile computing device 112. In some implementations, the MC 108 can be configured with holes/cutouts (not illustrated) permitting access to a "home" button, charging/data port, or other control(s) associated with the mobile computing device.

In some implementations, the AGVS 100 (for example, the body 102) can be configured (not illustrated) to permit the MC 108 to be rotated to secure the mobile computing device in alternative orientations (for example, portrait, landscape, or an orientation in-between). In some implementations, the configurations can permit the MC 108 to be rotated, locked, or adjusted depending on various applications, scenarios, or uses.

As previously described, the MC 108 includes a slot 122. The slot 122 is configured to permit the trigger bar to physically touch the display 113. The slot 122 can be configured in size, shape, or orientation depending on a configuration of a particular mobile computing device, application to execute, scenario, or use. In the illustrated example, slot 122 permits vertical adjustment of the mobile computing device 112 in relation to the body 102, MU 104, and TU 106.

The AWs 110a/110b provides user-operable controls (for example, knobs, dials, wheels, or discs) to permit adjustment of the mobile computing device 112 in relation to the body 102, MU 104, and TU 106. While the AGVS 100 illustrated in FIG. 1 is configured to be adjusted vertically, in other implementations, the AGVS 100 can be configured to permit adjustments in vertical, horizontal, or diagonal directions. Adjustment configurations can also include adjustments to the proximity of (that is, closer to or farther from) one or more elements of the AGVS 100 to display 113 of the mobile computing device 112. For example, the proximity of the MU 104 to the display 113 can be adjusted using one or more of the AWs 110a/110b.

Figure 2:
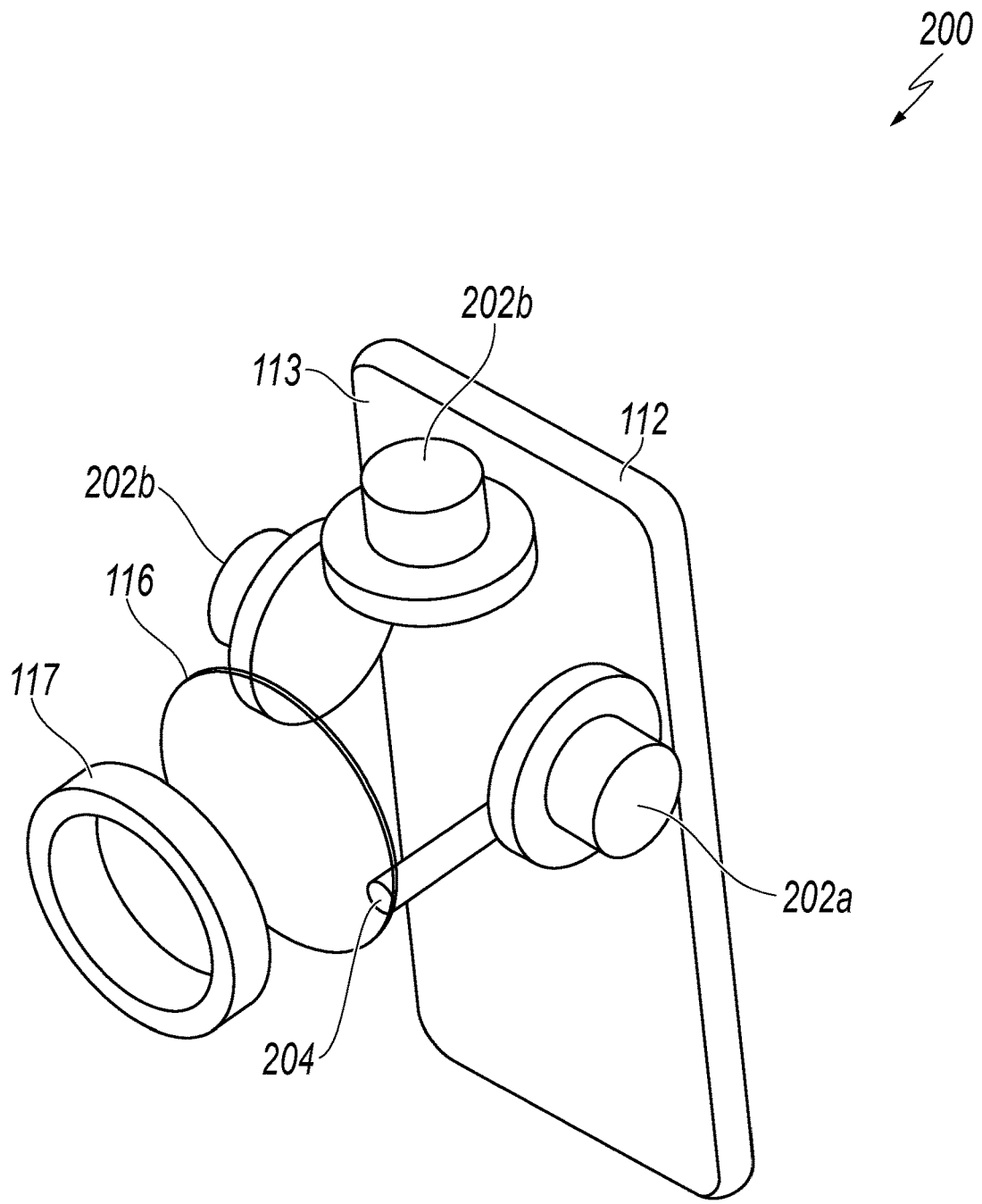
FIG. 2 is a low-level perspective view of internal structures of an AGVS, according to an implementation of the present disclosure.

Detection on the display 113 of increased/reduced pressure or an amount of contact (for example, using adjustment contact wheels or other structures—refer to FIG. 2 for additional detail) can be used to simulate focus actions of a visual image viewed through the eyepiece 114 or to "tune" a simulated trigger for faster firing or increased sensitivity. The adjustments can be used to emulate adjustments of a rifle scope or other optical device or other elements (for example, a trigger) of a simulated weapon system.

In a particular implementation, one illustrated dial (indicated by label 110a) can be used to make vertical adjustments, while the other illustrated dial (110b) can be used to make inward/outward adjustments to the proximity of the AGVS 100 to the mobile computing device 112. The described knobs, dials, wheels, or discs can be configured to permit easy use by a user's fingers (for example, with ridged or textured edges).

In some implementations, a software application executing on the mobile computing device 112 can detect adjustments to the AGVS 100/mobile computing device 112 relationship and adjust areas of the display 113 that are sensitive to contact/interaction with elements (for example, the trigger bar or adjustment contact wheels/other structures) of the AGVS 100.

As an example of usage of the described AGVS 100, a user/player (of a group of two or more user/players) executes a software application on the mobile computing device 112 for a particular application, scenario, or use (such as, a combat-type targeting game). The mobile computing device 112 is secured and properly positioned within the AGVS 100.

The players focus image data received from an imaging device of the mobile computing device 112 (or an auxiliary imaging device attached to the mobile computing device 112) through the eyepiece 114 for clarity. The AGVS 100 can be used with the software application to provide virtual—(for example, simulated) or augmented—reality (for example, actual and virtual data overlay) applications using the received image data.

The combat-type targeting game is started. The game provides a player with a unique capability for hands-on emulation of performance and adjustments to a day- or night-vision weapon optical device (for example, a rifle scope), an ability to learn and to practice controls (such as, windage and elevation adjustments), and to "target" an opposing player. The configuration of the AGVS 100 allows game developers to develop multiple gaming scenarios to permit manual touch-type controls on a computing device display 113.

Each player uses the AGVS 100 with attached mobile computing device 112 to visually "target" an opposing player using the received visual data. In this way, a competitive gaming experience can be enhanced for players to engage in a virtual combat experience without a requirement to use a laser, projected light source, or any other active energy emitting device to mark an opposing player.

In some implementations, the AGVS can be used with-or-without a MU 104. For example, the AGVS 100 can be configured to programmatically combine a player location, compass direction of a mobile computing device imaging device field-of-view (FOV) and an image recognition application as part of the game. In this example, the opposing player can be located in the FOV of a player's imaging device/auxiliary imaging device and the AGVS 100 can recognize the opposing player (for example, the image recognition software can identify a human shape, a particular displayed logo, or other visually-recognizable object. In this example, player location, movement, and other data can be determined (for example, using GPS) to provide a distance between particular players and to estimate if a reticle (such as, a cross-hair) is properly adjusted by using one or more AWs 110a/110b.

A server-based software application can be used in conjunction with the AGVS 100 to keep score, store images of confirmed hits and any other relevant information. One or more software applications associated with the AGVS 100 can permit two-way or hive-type audio/visual communication between players, other parties (such as, spectators/trainers), or a combination of both. The use of two-way audio/visual communication permits emulation of a modern tactical-type environment. In some implementations, live video from a FOV of a player's mobile computing device imaging device/auxiliary imaging device (or other sensor data) can be gathered, collected, transmitted, stored, and processed to allow real-time analysis of player actions, tactics, strategies, performance, metrics, or scores.

When a player actuates the trigger 118, the software application detects a touch to the display 113 and can determine, among other things, location of an opposing player in relation to a simulated reticle in the eyepiece 114, trigger timing, player movement, projectile type/characteristics, and distance between players to determine whether the opposing player was "hit." The software application can simulate a laser, bullet, rubber band, projectile speed, projectile drop due to gravity or other factors, atmospheric conditions, and other relevant data. In some implementations, each mobile computing device can transmit (for example, using a cellular, Bluetooth, WIFI, or other data network) location and other data between themselves or to a central server-type computer for sharing to permit increased accuracy in determining player location, when a hit has occurred, or other status information.

FIG. 2 is a low-level perspective view of internal structures of an AGVS, according to an implementation of the present disclosure. FIG. 2 illustrates (as described in FIG. 1) the mobile computing device 112, display 113, lens 116, and fine-focus assembly 117.

Also illustrated are three adjustment contact wheels 202a/202b/202c (not entirely representative of adjustment contact wheels corresponding with the AWs 110a/110b of FIG. 1). The adjustment contact wheels 202a/202b/202c are configured to permit a software application to detect contact of the AGVS 100 with the display 113 and to adjust a relationship of the mobile device 112 with respect to the AGVS 100. For example, in an implementation, the adjustment contact wheels 202a/202b/202c can be configured of non-marring, conductive materials to simulate capacitive touch(s) to the display 113 or an amount of contact/pressure and to permit the adjustment of the mobile device 112 with respect to the AGVS 100 in vertical, horizontal, or diagonal directions. In this example, the AWs 110, grip 120, or trigger 118 of FIG.

1 can be configured to transmit electrical/capacitive impulses from a user's hand to one or more of the adjustment contact wheels 202a/202b/202c to permit detection by the mobile computing device 112. In some implementations, touch data is gathered by the display 113 to activate one or more responses by the software program according to established parameters. Indicated pressure/contact amount on the display 113 can be used to adjust a simulated focus or adjustment of aspects (for example, windage or elevation) of a simulated optical device.

FIG. 2 also illustrates a trigger bar 204 as described in FIG. 1. In some implementations, the trigger bar 204 is actuated by the trigger 118 of FIG. 1. A stylus tip coupled to the trigger bar 204 can make contact with the display 113. The trigger bar 204 is configured to transmit electrical/capacitive impulses from a user's finger to the display 113 to permit detection by the mobile computing device 112. In some implementations, touch data is gathered by the display 113 to activate one or more responses by the software program according to established parameters. For example, indicated pressure/contact amount on the display 113 can be used to trigger firing of a simulated weapon or a trigger pressure needed to fire the simulated weapon.

Figure 3A:
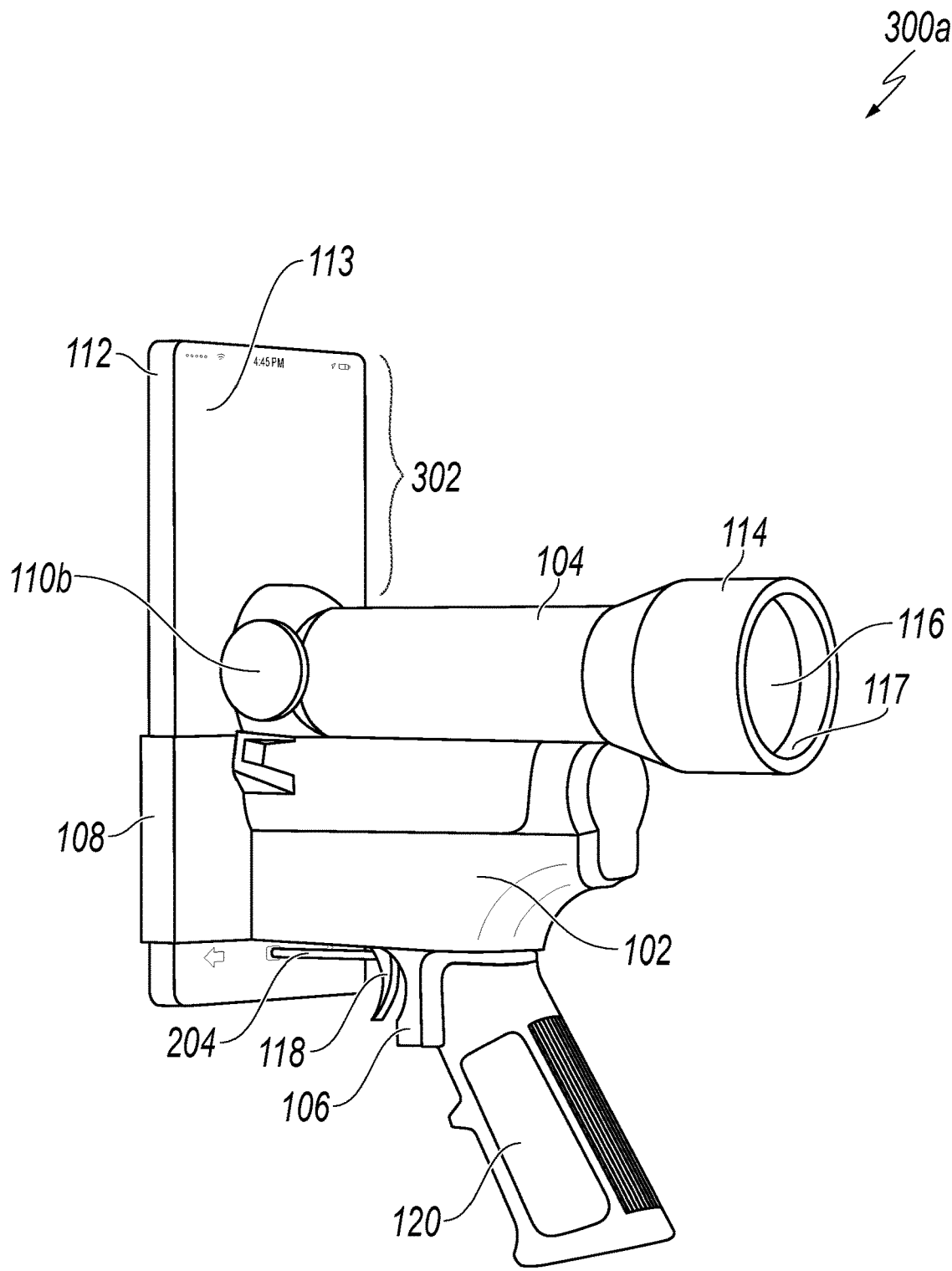
FIG. 3A is a perspective view of an alternative AGVS configuration, according to an implementation of the present disclosure.

FIG. 3A is a perspective view 300a of an alternative AGVS configuration, according to an implementation of the present disclosure. As illustrated in FIG. 3A, the alternative AGVS configuration secures the mobile computing device 112 in a horizontal manner with the MC 108. With the mobile computing device in a portrait position, part of the display 113 is visible (302) above the top of the MU 104. The alternative AGVS configuration permits a software application to display data (for example, location, score, a map, warning colors, arrows, textual data, or other relevant data consistent with this disclosure) for use by a user and to allow a user to look through the eyepiece 114 when needing to aim. Also illustrated is trigger bar 204 of FIG. 2.

In some implementations, the software application can auto adjust the amount of the display 113 used for data display. The software application can make the adjustment based on data received from the adjustment contact wheels (for example, 202a/202b/202c of FIG. 2), trigger bar 204, or both the adjustment contact wheels of FIG. 2 and trigger bar 204.

In an alternative implementation of FIG. 3A (not illustrated), the mobile computing device 112 can be oriented in a landscape position with the MC 108 securing the mobile computing device 112 vertically. In this implementation, one or more "sides" of the mobile computing device can be used to display the previously described data.

Figure 3B:
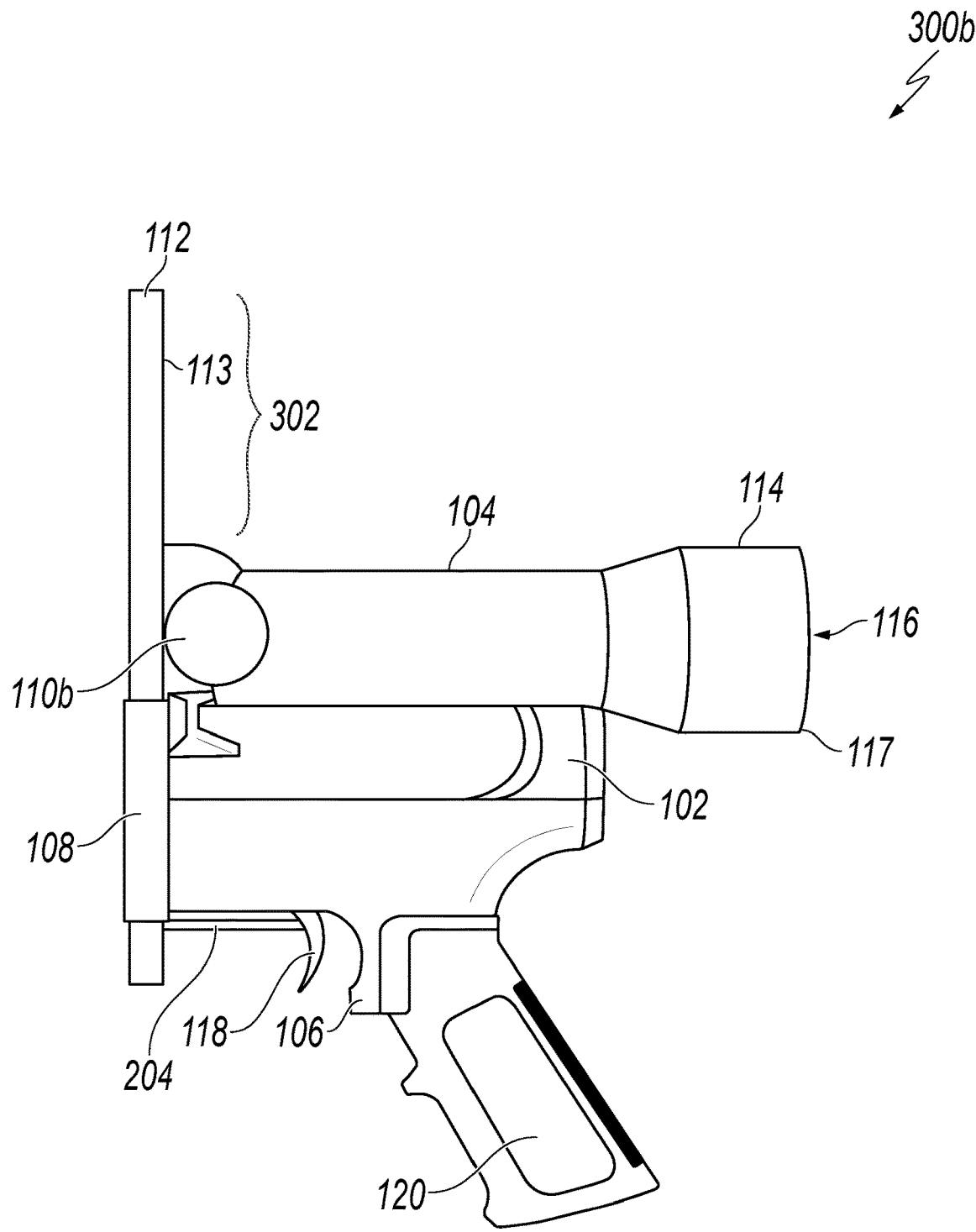
FIG. 3B is a side view of the alternative AGVS configuration of FIG. 3A, according to an implementation of the present disclosure.

FIG. 3B is a side view 300b of the alternative AGVS configuration of FIG. 3A, according to an implementation of the present disclosure. FIG. 3B provides a perspective view of how much of the display 113 is visible to a user and available for data display.

Figure 4:
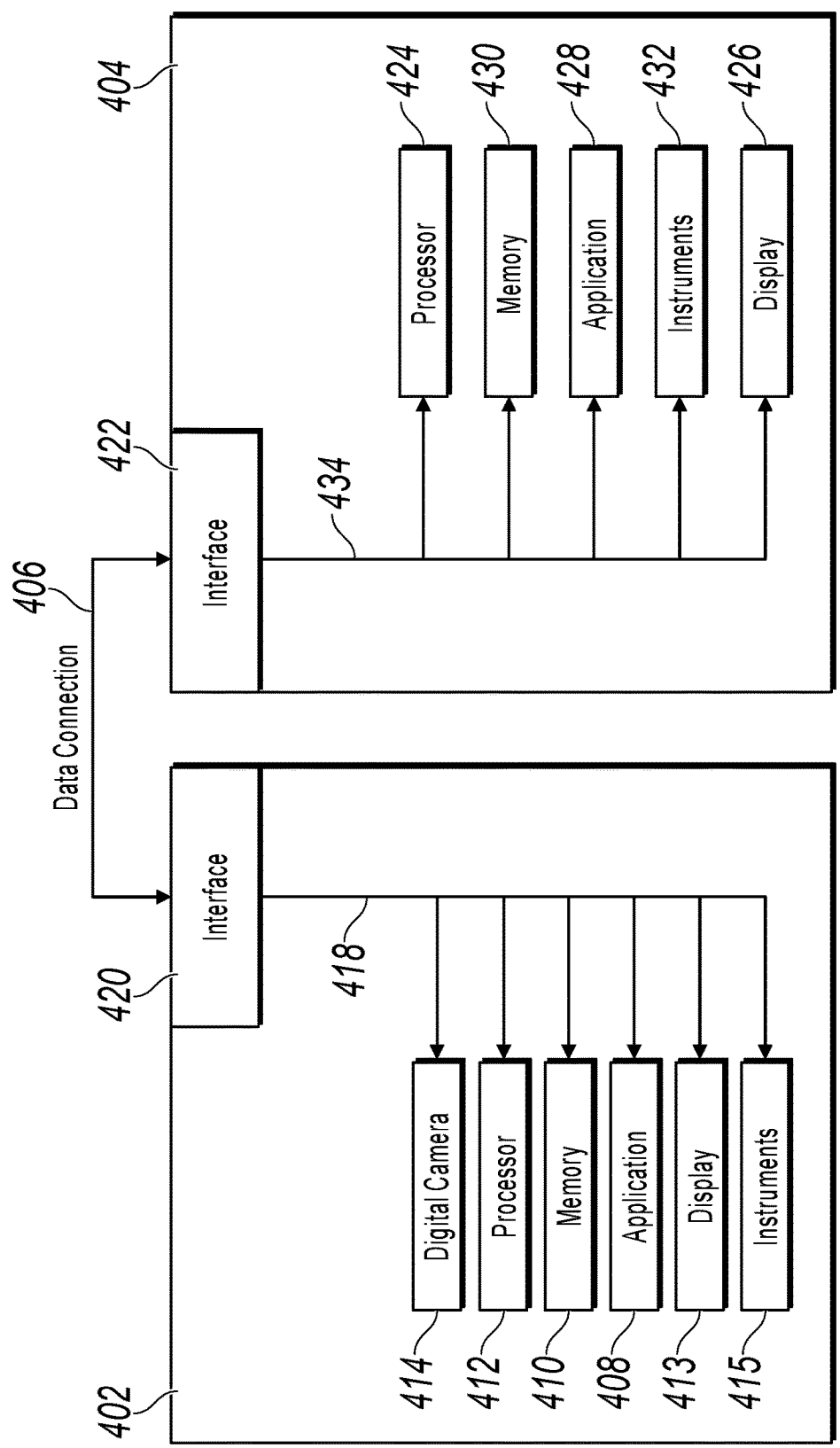
FIG. 4 is a block diagram illustrating components of an example system for providing gameplay on dual displays, according to implementations of the present disclosure.

FIG. 4 is a block diagram illustrating components of an example dual display system 400. The dual display system 400 includes a mobile computing device 402, such as a mobile communications handset, which may be in the form of a smart phone. The mobile computing device 402 may be similar to the mobile computing device 112 described above such that the mobile computing device 402 is securable in a mounting component of an AGVS, which may be similar to the MC 108 of AGVS 100 described above. The dual display system 400 also includes a secondary display component 404. The secondary display component 404 may be in the form of an electronic component that includes a display for displaying, for example, video images, text, graphics, and other visual information. For example, in some implementations, the secondary display component may be a high definition television display, a computer that includes a computer display, a tablet, another smart phone, a projector, or other display device operable to receive image information and exhibit the associated images on a display. The mobile computing device 402 and the secondary display component 404 communicate across a data connection 406. Although the example system 400 illustrates a single secondary display component 404, the example system 400 may have a plurality of secondary display components 404.

In some implementations, the mobile computing device 402 is an electronic computer operable to receive, transmit, process, store, manage, and/or display data and information associated with the system 400. More particularly, the mobile computing device 402 is operable to run an application 408 located on the mobile computing device 402. In some implementations, the application 408 may be stored in memory 410. Although illustrated as a single memory 410 in FIG. 4, two or more memories may be used according to particular needs, desires, or particular implementations of the system 400. While memory 410 is illustrated as an integral component of the mobile computing device 402, in alternative implementations, memory 410 can be external to the mobile computing device 402 or the system 400 more generally. Similarly, application 408 may be located external to the mobile computing device or the system 400 more generally.

The mobile computing device may also include one or more instruments 415. The instruments 415 may include various hardware or software or both hardware and software instruments to collect data to make available to the application 408. For example, instruments 415 may include one or more of the following instruments: a global positioning system (GPS) receiver, a GPS transmitter, an accelerometer, a gyroscopic sensor, compass, wireless radio, temperature sensor, pressure sensor, altimeter, or other instrument.

The mobile computing device 402 also includes a processor 412 that is operable to run or execute the application 408. The processor 412 may be a single processor or multiple processors. In some implementations, the application 408 may be a combat-type targeting game, and the mobile computing device 402 may be operable to display gameplay images associated with the combat-type targeting game on a display 413 of the mobile computing device 402. The mobile computing device 402 also includes a camera 414, such as a digital camera. The mobile computing device 402 is operable to capture still or video images using the camera 414. In some instances, the application 408 may utilize the camera 414 to capture still or video images as part of the application 408. For example, where the application 408 is a combat-type targeting game, the combat-type targeting game may use the camera to obtain continuous or intermittent real-time video images and display those real-time video images on the display 413.

As described above, the mobile computing device 402 may be a mobile telecommunication handset, such as a smart phone. More generally, the mobile computing device 402 may be any other portable computer that is mountable into a mounting component of an advanced gaming visualization system, as described herein. As will be apparent to those of ordinary skill in the art, the mobile computing device 402 contains unillustrated control and processing circuitry with or without other components to permit the above-described functionality.

The secondary display component 404 is operable to send or receive data from the mobile computing device 402. For example, in some implementations, the secondary display component 404 is operable to receive data, such as video, audio, or sensor data (such as one or more sensor data types described herein), via the data connection 406. For example, the image recognition and GPS position information may also be transmitted to the secondary display component 404 via the data connection 406 for use by the secondary display component 404. In some implementations, the secondary display component 404 is operable to display the received data, process the received data, or both. Particularly, a display 426 of the secondary display component 404 is operable to display a modified or unmodified image that is displayed on the display 413 of the mobile computing device 402. In some implementations, the secondary display component 404 is operable simultaneously to display a modified or unmodified image displayed by the mobile computing device 402 on the display 413. In some implementations, the secondary display component 404 processes data received from the mobile computing device 402 using application 428 and processor 424.

The data connection 406 may be a wired or wireless connection. Example wired connections, either a direct or indirect connection, may include a universal serial bus (USB) connection, a FireWire connection, or any other wired connection operable to transmit information from the mobile computing device 402 to the secondary display component 404. Wireless connection types include cellular, Bluetooth®, WIFI, or any other wireless communication types that are operable to transmit information from the mobile computing device 402 to the secondary display component 404.

Each of the components of the mobile computing device 402 communicates using a system bus 418. In some implementations, any or all the components of the mobile computing device 402 (whether hardware, software, or both) may interface with each other, an interface 420, or both over the system bus 403 using an application programming interface (API), service layer, or the like. The API may include specifications for routines, data structures, and object classes. The API may be either computer-language independent or dependent and refer to a complete interface, a single function, or even a set of APIs. The service layer provides software services to the system 400. The functionality of the mobile computing device 402 may be accessible for all service consumers using this service layer. Software services, such as those provided by the service layer, provide reusable, defined business functionalities through a defined interface. For example, the interface may be software written in JAVA, C++, or other language providing data in extensible markup language (XML) format or other suitable format. Any or all parts of the API and/or the service layer may be implemented as child or sub-component of another piece of software without departing from the scope of this disclosure. For example, the API 112 could be integrated into the application 408.

The interface 420 of the mobile computing device 402 is used for communicating with the secondary display component 404 connected to the data connection 406. Generally, the interface 420 includes logic encoded in software or hardware or both software and hardware in a combination that is operable to communicate with the data connection 406. In some implementations, the interface 420 may include software supporting one or more communication protocols associated with communications such that the data connection 406 or hardware associated with the data connection 406 is operable to communicate physical signals within and outside of the illustrated system 400.

The secondary display component 404 includes an interface 422. Although illustrated as a single interface 422 in FIG. 4, two or more interfaces 422 may be used according to particular needs, desires, or particular implementations of the system 400. Similar to interface 420, the interface 422 is used by the secondary display component 404 for communicating with the mobile computing device 402 connected to the data connection 406. Generally, the interface 422 includes logic encoded in software or hardware or both software and hardware in a combination that is operable to communicate with the data connection 406. More specifically, the interface 422 may include software supporting one or more communication protocols associated with communications such that the data connection 406 or hardware associated with the data connection 406 is operable to communicate physical signals within and outside of the illustrated system 400.

The secondary display component 404 includes a processor 424. The processor 424 may be a single processor or multiple processors. The processor 424 executes instructions and manipulates data to perform the operations of the secondary display component 404. For example, the processor 424 may execute functionality to display information, such as video images or other desired information, on a display 426. As explained above, the mobile computing device 402 may provide data to the secondary display component 404 via the data connection 406. In some instances, the data may include video image data. In some implementations, the processor 424 may use the application 428 to process the received data and display the processed data on the display 426.

The secondary display component 404 also includes a memory 430 that holds data for the secondary display component 404 or the mobile computing device 402, or both. Although illustrated as a single memory 430 in FIG. 4, two or more memories may be used according to particular needs, desires, or particular implementations of the system 400. While memory 430 is illustrated as an integral component of the secondary display component 404, in alternative implementations, memory 430 can be external to the secondary display component 404 or the system 400, more generally. In other implementations, the secondary display component 404 may also include instruments 432, which may include one or more instruments similar to instruments 415 described above.

In some implementations, the application 428 is software providing, among other things, functionality related to displaying video images and other information transmitted from the mobile computing device 402. For example, application 428 may be a downloadable application installed on the secondary display component 404. The application 428 may also allow for configuration of the secondary display component 404, generating and initiating display of GUI layouts on the associated display 426, receiving and processing data (e.g., from the mobile computing device 402), performing complex calculations, etc.

Although illustrated as a single application 428, similar to application 408, the application 428 may be implemented as multiple applications 428. In addition, although illustrated as integral to the secondary display component 404, in alternative implementations, the application 28 can be external to the secondary display component 404 or the system 400.

In some implementations, the interface 422, instruments 415, processor 424, memory 430, and application 428 of the secondary display component 404 may be either similar to or different than those described above with respect to the mobile computing device 402, but performing tasks, storing data, etc., particularly suited to the purposes of the secondary display component 404.

As explained earlier, the secondary display component 404 communicates with the mobile computing device 402 over data connection 406 to send data, receive data, or both. In some implementations, each of the components of the secondary display component 404 communicates using a system bus 434. In some instances, the functionality provided by the system bus 434 is similar to the above-described system bus 418. In some implementations, the system bus 434 may operate similarly to system bus 418 with respect to components of the mobile computing device 402 that are similar to, or can perform the same operations as, components of the secondary display component 404 and also depending upon the overall needs of the system 400 consistent with this disclosure, as understood by those of ordinary skill in the art.

In some implementations, the mobile computing device 402 is operable to transfer image data, such as real-time image data, to the secondary display component 404 such that the real-time image data is simultaneously displayed on both the display 413 of the mobile computing device 402 and the display 426 of the secondary display component 404. Thus, in instances where the display 426 of the secondary display component 404 is larger than the display 413, e.g., a high definition television or projection screen, the real-time image provided to and displayed by the display 426 is enlarged relative to the real-time image displayed on the display 413 of the mobile computing device 402. As a result, the enlarged real-time image displayed on the larger display 426 of the secondary display component 404 may provide a broader view as compared to a more limited view provided through a monocular unit of an AGVS coupled to the mobile computing device 402. Further, in some implementations, the real-time image may include an alignment feature, such as a symbol. In some implementations, the alignment feature may be a dot, and the dot, as part of the real-time image displayed on the display 413 of the mobile computing device 402, would be aligned with and be visible as a magnified object through the monocular unit of the AGVS.

Figure 5:
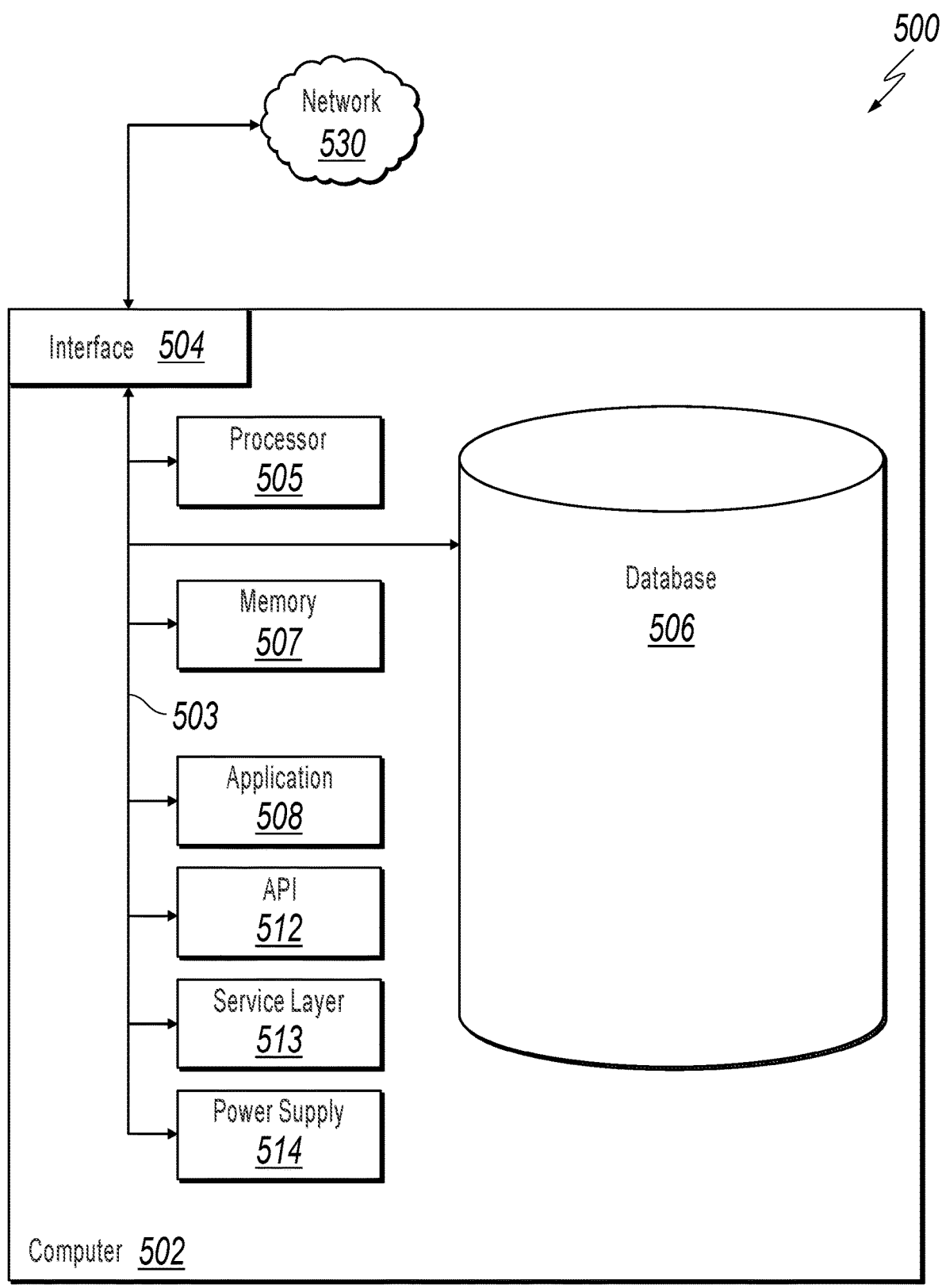
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 502 can include an input device, such as a keypad, keyboard, or touch screen, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as, for example, a client, network component, a server, or a database or another persistency, or a combination of roles for performing the subject matter described in the present disclosure. The illustrated Computer 502 is communicably coupled with a Network 530. In some implementations, one or more components of the Computer 502 can be configured to operate within an environment, or a combination of environments, including cloud-computing, local, or global.

At a high level, the Computer 502 is an electronic computing device operable to receive, transmit, process, store, or manage data and information associated with the described subject matter. According to some implementations, the Computer 502 can also include or be communicably coupled with a server, such as an application server, e-mail server, web server, caching server, or streaming data server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory or conventional database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, an Advanced Gaming Visualization System (AGVS) apparatus, comprising: a monocular unit permitting visualization of image data received from an imaging device associated with a mobile computing device and displayed on a display of the mobile computing device; a trigger unit for indicating a trigger actuation, wherein the trigger unit includes a trigger and a trigger bar, and wherein the trigger bar is moved by actuation of the trigger; a mounting component for mounting the mobile computing device in relation to the monocular unit and the trigger unit; and adjustment wheels for adjusting the position of the mobile computing device in relation to the monocular unit, the trigger unit, and the mounting component.

The foregoing and other described implementations can each, optionally, include one or more of the following features:

A first feature, combinable with any of the following features, comprising an eyepiece, magnification lens, and a fine-focus assembly.

A second feature, combinable with any of the previous or following features, wherein the magnification lens is configured as filtering or colored.

A third feature, combinable with any of the previous or following features, wherein the received image data is formatted for display on the display of the mobile computing device.

A fourth feature, combinable with any of the previous or following features, wherein the trigger actuation is detected by the mobile computing device through contact of a trigger bar with the display of the mobile computing device.

A fifth feature, combinable with any of the previous or following features, wherein the monocular unit, trigger unit, mounting component, and adjustment wheels are integrated using a body.

A sixth feature, combinable with any of the previous or following features, wherein the trigger unit comprises a grip.

A seventh feature, combinable with any of the previous or following features, wherein the mobile computing device includes a software application for processing the received image data.

A eighth feature, combinable with any of the previous or following features, wherein the mounting component is configured with a slot permitting access to the display of the mobile computing device by monocular unit and the trigger unit.

A ninth feature, combinable with any of the previous or following features, wherein the adjustment wheels manipulate adjustment contact wheels that make contact with the display of the mobile computing device for determination of mobile computing device position in relation to the monocular unit, the trigger unit, and the mounting component.

A tenth feature, combinable with any of the previous or following features, wherein the position includes vertical, horizontal, and diagonal directions and a proximity value.

A eleventh feature, combinable with any of the previous or following features, wherein the mounting component is configurable between a horizontal position and a vertical position.

A twelfth feature, combinable with any of the previous or following features, further comprising a computer, a communication system, or a power supply.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. An Advanced Gaming Visualization System (AGVS) apparatus, comprising:
    a monocular unit permitting visualization of image data received from an imaging device associated with a mobile computing device and displayed on a display of the mobile computing device;
    a trigger unit for indicating a trigger actuation, wherein the trigger unit includes a trigger and a trigger bar, wherein the trigger bar is moved by actuation of the trigger, and wherein the trigger actuation is detected by the mobile computing device through contact of the trigger bar with the display of the mobile computing device;
    a mounting bracket for mounting the mobile computing device in relation to the monocular unit and the trigger unit; and
    adjustment wheels for adjusting the position of the mobile computing device in relation to the monocular unit, the trigger unit, and the mounting bracket.

2. The AGVS apparatus of claim 1, comprising an eyepiece, magnification lens, and a fine-focus assembly.

3. The AGVS apparatus of claim 2, wherein the magnification lens is configured as filtering or colored.

4. The AGVS apparatus of claim 1, wherein the received image data is formatted for display on the display of the mobile computing device.

5. The AGVS apparatus of claim 1, wherein the monocular unit, trigger unit, mounting bracket, and adjustment wheels are integrated using a body.

6. The AGVS apparatus of claim 1, wherein the trigger unit comprises a grip.

7. The AGVS apparatus of claim 1, wherein the mobile computing device includes a software application for processing the received image data.

8. The AGVS apparatus of claim 1, wherein the mounting bracket is configured with a slot permitting access to the display of the mobile computing device by monocular unit and the trigger unit.

9. The AGVS apparatus of claim 1, wherein the adjustment wheels manipulate adjustment contact wheels that make contact with the display of the mobile computing device for determination of mobile computing device position in relation to the monocular unit, the trigger unit, and the mounting bracket.

10. The AGVS apparatus of claim 9, wherein the position includes vertical, horizontal, and diagonal directions and a proximity value.

11. The AGVS apparatus of claim 1, wherein the mounting bracket is configurable between a horizontal position and a vertical position.

12. The AGVS apparatus of claim 1, further comprising a computer, a communication system, or a power supply.

13. An Advanced Gaming Visualization System (AGVS) apparatus, comprising:
    a monocular unit permitting visualization of image data received from an imaging device associated with a mobile computing device and displayed on a display of the mobile computing device;
    a trigger unit for indicating a trigger actuation, wherein the trigger unit includes a trigger and a trigger bar, and wherein the trigger bar is moved by actuation of the trigger;
    a mounting bracket for mounting the mobile computing device in relation to the monocular unit and the trigger unit; and
    adjustment wheels for adjusting the position of the mobile computing device in relation to the monocular unit, the trigger unit, and the mounting bracket, wherein the adjustment wheels manipulate adjustment contact wheels that make contact with the display of the mobile computing device for determination of mobile computing device position in relation to the monocular unit, the trigger unit, and the mounting bracket.

14. The AGVS apparatus of claim 13, comprising an eyepiece, magnification lens, and a fine-focus assembly.

15. The AGVS apparatus of claim 14, wherein the magnification lens is configured as filtering or colored.

16. The AGVS apparatus of claim 13, wherein the received image data is formatted for display on the display of the mobile computing device.

17. The AGVS apparatus of claim 13, wherein the monocular unit, trigger unit, mounting bracket, and adjustment wheels are integrated using a body.

18. The AGVS apparatus of claim 13, wherein the position includes vertical, horizontal, and diagonal directions and a proximity value.

19. The AGVS apparatus of claim 13, wherein the mobile computing device includes a software application for processing the received image data.

20. The AGVS apparatus of claim 13, wherein the mounting bracket is configured with a slot permitting access to the display of the mobile computing device by monocular unit and the trigger unit.

* * * * *